United States Patent [19]

Morisawa et al.

[11] Patent Number: 4,651,233
[45] Date of Patent: Mar. 17, 1987

[54] TRACKING DEVICE FOR ELECTRONIC STILL SINGLE-LENS REFLEX CAMERA

[75] Inventors: Tahei Morisawa; Kiyoshi Kawano, both of Tokyo, Japan

[73] Assignee: Asahi Kogaku Kogyo Kabushiki Kaisha, Tokyo, Japan

[21] Appl. No.: 669,719

[22] Filed: Nov. 9, 1984

[30] Foreign Application Priority Data

Dec. 24, 1983 [JP] Japan ................. 58-251410

[51] Int. Cl.[4] ............... H04N 5/781; G11B 21/08
[52] U.S. Cl. ........................ 360/35.1; 360/106; 358/906; 358/909
[58] Field of Search ............ 358/335, 906, 909; 360/35.1, 33.1, 106, 97, 78; 369/219, 221

[56] References Cited

U.S. PATENT DOCUMENTS 4,553,175 11/1985 Baumeister ............... 358/906

FOREIGN PATENT DOCUMENTS 47910 10/1979 Japan ................ 358/906
114978 7/1984 Japan ................ 360/35.1

Primary Examiner—Alan Faber
Attorney, Agent, or Firm—Sughrue, Mion, Zinn Macpeak & Seas

[57] ABSTRACT

An electronic still single-lens reflex camera having an improved tracking device employing a simplified construction and having a lowered manufacturing cost. A head feed mechanism is operated in association with the operation of a drive unit which drives the image mirror of the camera in such a manner that the magnetic recording head is moved radially of the magnetic medium in association with the operation of the image mirror. The head mechanism includes a stage on which the recording head is mounted, a feed gear, a feed pawl, a tracking bar supporting the feed pawl and movable with the retraction of the image mirror from the image beam path, and a motion converting mechanism for converting the rotation of the feed gear into linear motion of the stage, the feed gear being turned through a predetermined angle by the feed pawl.

3 Claims, 6 Drawing Figures

TRACKING DEVICE FOR ELECTRONIC STILL SINGLE-LENS REFLEX CAMERA

BACKGROUND OF THE INVENTION

The present invention relates to an electronic still single-lens reflex camera having an image sensor which subjects the image of an object to photoelectric conversion to obtain an electrical signal, and the electrical signal thus obtained is recorded on a magnetic recording medium by a magnetic recording head. More particularly, the invention relates to a tracking device for moving the recording head radially of the recording medium.

In an electronic camera, an image senor such as a solid-state image pickup element is used to obtain an electrical signal indicative of the brightness of the image of an object, and the electrical signal thus obtained is stored on a magnetic disk. Because the electronic camera employs an image sensor instead of film, in the electronic camera, the essential components of the camera other than the image sensor may be the same as those of a conventional film camera using film such as a still single-lens reflex camera. That is, the photometric device, the viewfinder optical system, the quick return mirror, the shutter and the lens stop of the still single-lens reflex camera can be used without modification to control exposure.

As mentioned above, in an electronic still single-lens reflex camera, the output electrical signal of the image sensor is processed and recorded and a recording medium, namely, a recording disk. A magnetic recording head is used to record the electrical signal on the recording disk. After one image signal has been recorded, the magnetic recording head must be moved radially of the magnetic disk (hereinafter referred to as "tracking") before the next image signal is recorded to then confront a new magnetic recording region on the surface of the magnetic disk. In other words, in an electronic camera, after one picture has been taken upon depressing the shutter button and recorded on the recording disk, tracking must be carried out before the next picture is taken. In a conventional electronic still single-lens reflex camera, a special drive source such as a pulse motor or servo motor is employed for the tracking of the recording head. Therefore, the camera suffers from difficulties that the manufacturing costs is high and the construction is intricate. Furthermore, the power consumption is large.

SUMMARY OF THE INVENTION

In view of the above-described difficulties accompanying a conventional electronic still single-lens reflex camera, the invention has been developed on the technical concept that the power for the tracking of the magnetic recording head is obtained from a drive unit for an image mirror which is normally positioned in the image beam path to direct the image beam to the viewfinder optical system and which, when a photographing operation is performed, is retracted from the image beam path to apply the image beam to the image sensor.

More specifically, an important feature of the electronic still single-lens reflex camera of the invention resides in that a head feed mechanism is operated inn association with the operation of the image mirror drive unit in such a manner that the magnetic recording head is moved radially of the magnetic recording medium in association with the operation of the image mirror.

DESCRIPTION OF THE PREFERRED EMBODIMENTS

The invention will be described with reference to preferred embodiments.

Figure 1:
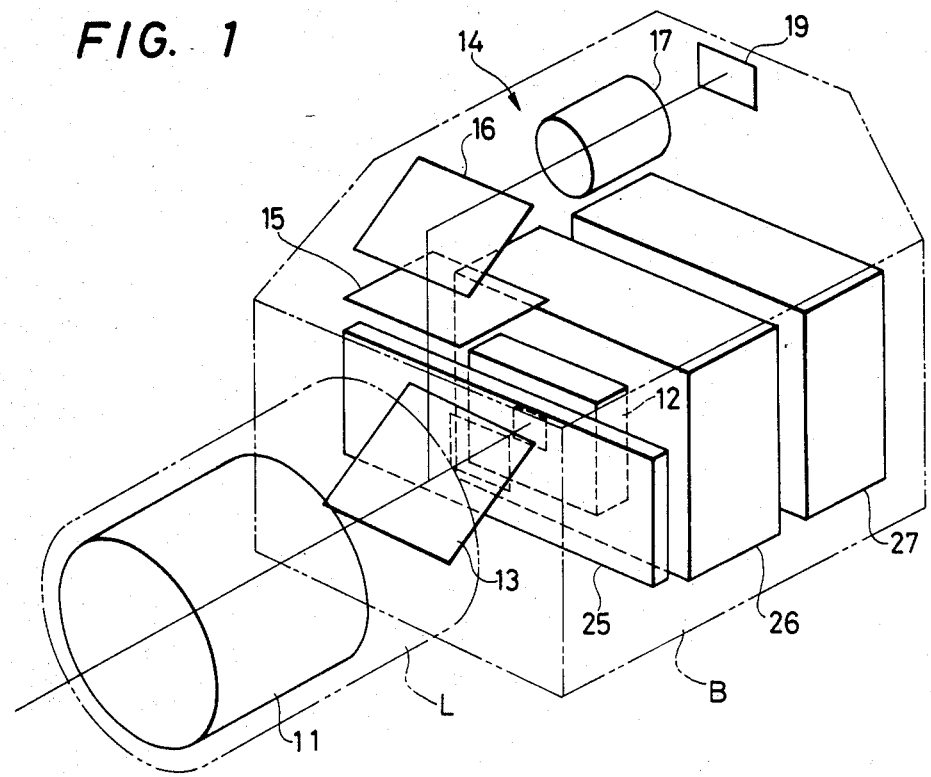
FIG. 1 is a perspective view outlining an example of the construction of an electronic still single-lens reflex camera.
Figure 2:
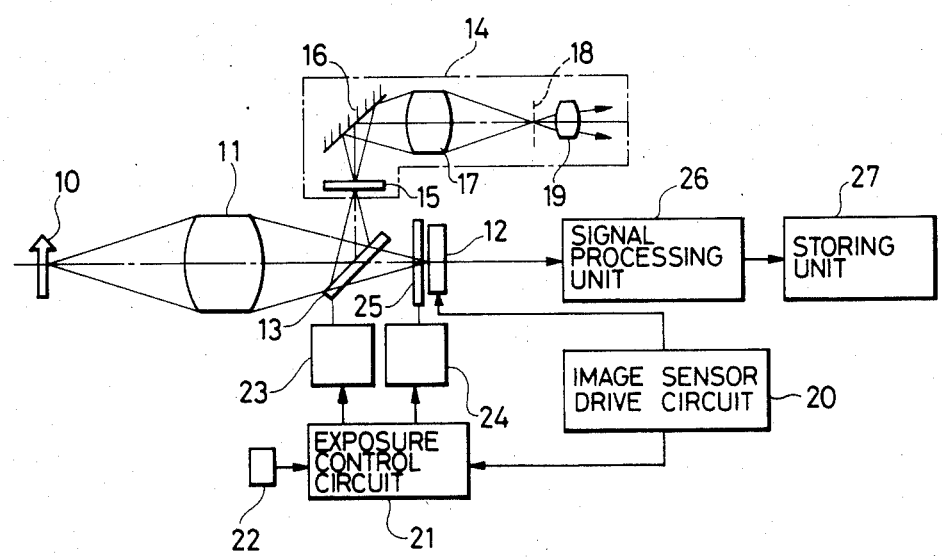
FIG. 2 is a connection diagram of the camera including its optical system.

FIGS. 1 and 2 show the fundamental arrangement of an electronic camera of the type which the invention pertains. The electronic camera includes a lens barrel L having a photographing lens 11 and a body B. The body B incorporates elements for processing the image of an object 10 formed by the photographing lens 11. More specifically, an image sensor 12 is disposed on the optical axis (image beam), and a shutter 25 and an image mirror 13 are arranged in front of the image sensor 12. The image mirror 13 normally forms an angle of 45° with respect to the optical axis to apply the image beam to a viewfinder optical system including a focusing screen 15, a mirror 16, a relay lens 17 and an eyepiece lens 19. However, during a photographing operation, the image mirror is retracted from the image beam so that the image beam is applied to the image sensor 12. The viewfinder optical system 14 may be of a conventional type using a pentaprism. Accordingly, with the optical system of the electronic camera, normally the image of an object is formed on an image-forming plane 18 in the viewfinder optical system 14, and the image thus formed can be observed through the eyepiece lens 19, while in a photographing operation, the image mirror 13 is swung upwardly to direct the image beam to the image sensor 12.

Figure 6:
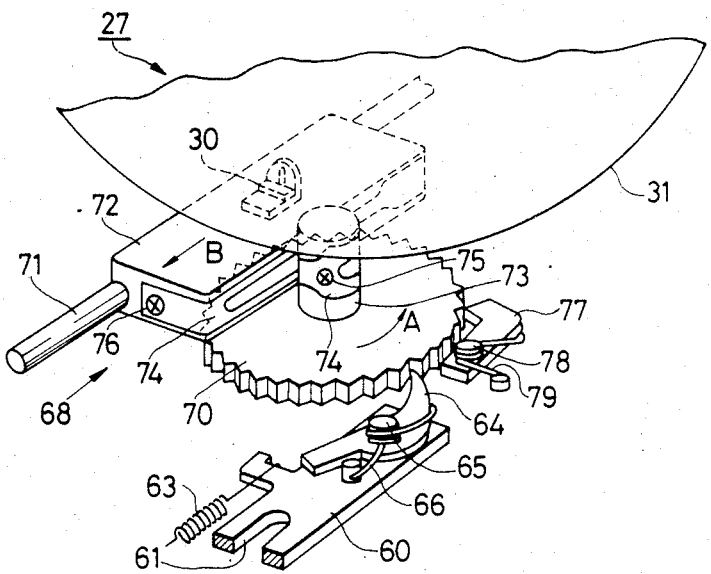
FIG. 6 is a perspective view showing an operating condition different from that shown in FIG. 4.

When a release switch is depressed in a photographing operation, an image sensor drive circuit 20 effects scanning of the image sensor 12 for a period of one field or frame to eliminate charges accumulated in the image sensor 12. An exposure control circuit 21 outputs an exposure control signal according to the output of a photometric element 22 which subjects the brightness of the image of an object to photoelectric conversion. A mirror drive unit 23 retracts the image mirror 13 from the image beam after the aforementioned scanning has been accomplished. Next, the shutter 25 is opened by a shutter drive unit 24 which receives the output of the exposure control circuit 21, and the shutter 25 is closed after correct exposure has been accomplished. Upon completion of the exposure, the image mirror 13 is returned to the initial position where it was before being retracted, and at the same time the image sensor drive circuit 20 scans one field or frame so that the charges which are accumulated in the image sensor 12 while the shutter 25 is maintained open are read and applied to a signal processing circuit 26. In the signal processing circuit, the image signal is suitably processed and applied to a storing unit 27 with a magnetic recording head 30 (see FIGS. 4 and 6) where it is stored on a magnetic disk 31 (see FIGS. 4 and 6). When the shutter 25 is closed, motors in the shutter drive unit 24 and the mirror drive unit 23 are driven to restore the drive forces of the shutter 25 and the image mirror 13. Thus, the camera has become ready for the next photographing operation.

Figure 3:
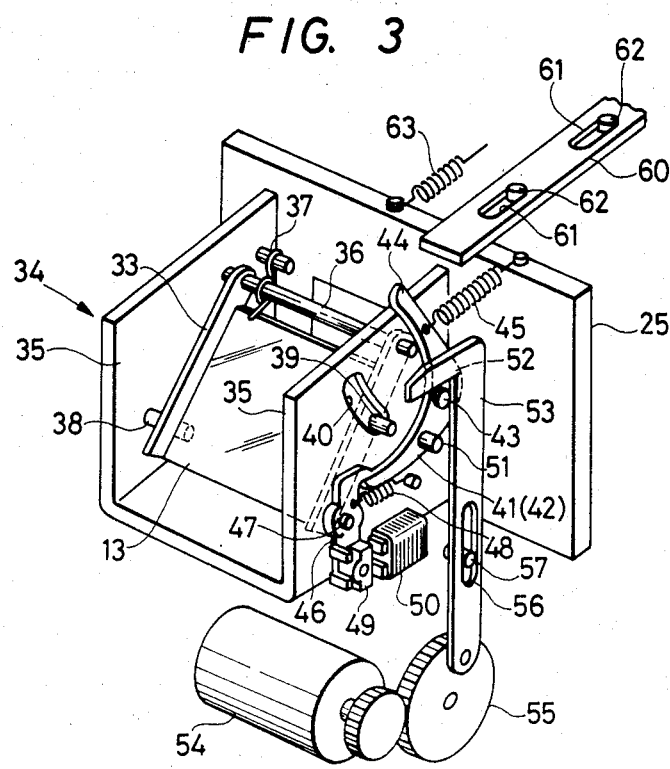
FIG. 3 is a perspective view showing essential components of an example of an electronic still single-lens reflex camera according to the invention.
Figure 4:
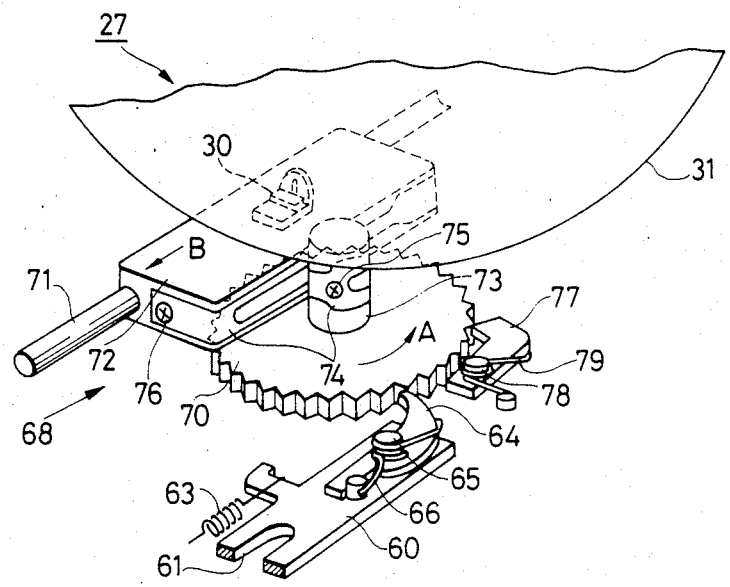
FIG. 4 is a side view of the same.

FIGS. 3 and 4 show a preferred embodiment of a head loading device of this invention in which the mirror drive unit 23, the shutter 25, the storing unit 27, and an interlocking mechanism for the mirror drive unit 23 and the storing unit 27 are shown. The mirror 13 is bonded to a mirror sheet 33. The upper edge of the mirror sheet 33 is fixedly secured to a mirror sheet shaft 36 which is pivotally held between inner walls 35 of a mirror box 34. The image mirror 13 together with the mirror sheet shaft 36 can swing between the position where it forms an angle of 45° with the image beam and the position to which it is retracted from the image beam. Reference numeral 37 designates a return spring which urges the image mirror 13 downwardly to position it in the image beam path. Reference numeral 38 designates a positioning pin which holds against the elastic force of the spring 37 the image mirror 13 at the position where the latter forms an angle of 45° with the image beam.

An operating pin 39 is fixed to one side of the mirror sheet 33. The operating pin 39 is engaged with an arcuate groove 40 formed in the inner wall 35 extending outside the inner wall. An operating lever 42 having an operating arm 41 is pivotally mounted on a shaft 43 fixed to the outside of the inner wall 35. The operating arm 41 is engageable with the operating pin 39 from below. A tension spring 45 is connected to the interlocking arm 44 of the operating lever 42 to urge the operating arm 41 upwardly. A locking lever 46 is pivotally mounted on a shaft 47 fixed to the outside of the inner wall 35. The locking lever 46 is engaged with the operating arm 41 so that the operating arm 41 is held at the position where it is not engaged with the operating pin for times other than exposure times. Reference numeral 48 designates a tension spring used to turn the locking lever 46 so as to cause the latter to engage with the operating arm 41. The locking lever 46 has an armature 49, and an exciting magnet 50 is fixedly mounted on the inner wall 35 in such a manner that there is a predetermined gap between the magnet 50 and the armature 49. When the magnet 50 is excited, the armature 49 is attracted by the magnet 50 so that the locking lever 46 is disengaged from the operating arm 41.

A charge pin 51 is fixed to the operating lever 42. A charge lever 53 having a hook 52 engageable with the charge pin 51 is provided beside the inner wall 35. The lower end portion of the charge lever 53 is pivotally mounted on a pin which is provided on a drive gear 55 at an eccentric position and which is driven through a reduction gear by an electric motor 54. An elongated hole 56 formed in the charge lever is engaged with a stationary guide pin 57 so that the charge lever 53 is movable substantially vertically. When the hook 52 is held at a rest position as shown in FIG. 3, it will not engage with the operating pin 39 of the image mirror 13 which is swung upwardly at the time of exposure. When the drive gear 55 makes on revolution after exposure, the hook 52 engages the charge pin 51 of the operating lever 42 which has been turned upwardly. As a result, the operating lever 42 is turned and the operating arm 41 is therefore engaged with the locking lever 46 as shown in FIG. 3.

A tracking bar 60 is provided above and behind the operating lever 42 with a front end face thereof engageable with the interlocking arm 44 of the operating lever 41. Stationary guide pins 62 are engaged with front and rear elongated holes, respectively, formed in the tracking bar 60, to regulate the sliding direction and distance of the tracking bar 60. The tracking bar 60 is urged by a tension spring 63 so that it is pulled forwardly, towards the interlocking arm 44. The tracking bar 60 is interlocked with a storing unit 27 provided behind the image sensor 12. A feed pawl 64 is pivotally mounted on a shaft 65 fixed to the rear end portion of the tracking bar as shown in FIG. 4. The feed pawl 64 is urged by a feed pawl spring 66 so that it is turned to engage with a feed gear (ratchet gear) 70 of a head feed mechanism 68 of the storing unit 27.

The storing unit 27 and the head feed mechanism 68, as shown in FIG. 4, are provided with the above-mentioned magnetic disk 31 which is rotated by a rotating mechanism (not shown) for recording image signals, and the above-mentioned magnetic recording head for recording image signals on the magnetic disk 31. The magnetic recording head 30 is secured to a stage 72 which is movably supported on a guide rail 71 extending radially of the magnetic disk 31. The stage 72 is positioned above one side of the feed gear 70. A still belt drum 73 integral with the shaft of the feed gear 70 is located beside the stage 72. A still belt 74 is wound on the still belt drum 73, and the middle part of the still belt 74 is secured to the still belt drum 73 with a screw 75. Both ends of the still belt 74 are fixedly secured to the stage 72 with screws 76. When the feed gear 70 is turned, the rotation of the feed gear 70 is converted into linear motion by the still belt drum 73 and the still belt 74. The motion converting mechanism may be formed by using a gear mechanism or other elements; however, the motion converting mechanism using the still belt 74 is advantageous in that no backlash is caused.

Reference numeral 77 designates a positioning and reverse rotation preventing pawl which is rockable about an external stationary shaft 78 and is urged by an energizing spring 79 so as to engage with the feed gear 70. That is, in cooperation with the teeth of the feed gear 70, the pawl 77 allows the gear 70 to turn only in the direction of the arrow A when engaged, and accurately determines the stop position of the feed gear 70 according to the pitch of the teeth.

Figure 5:
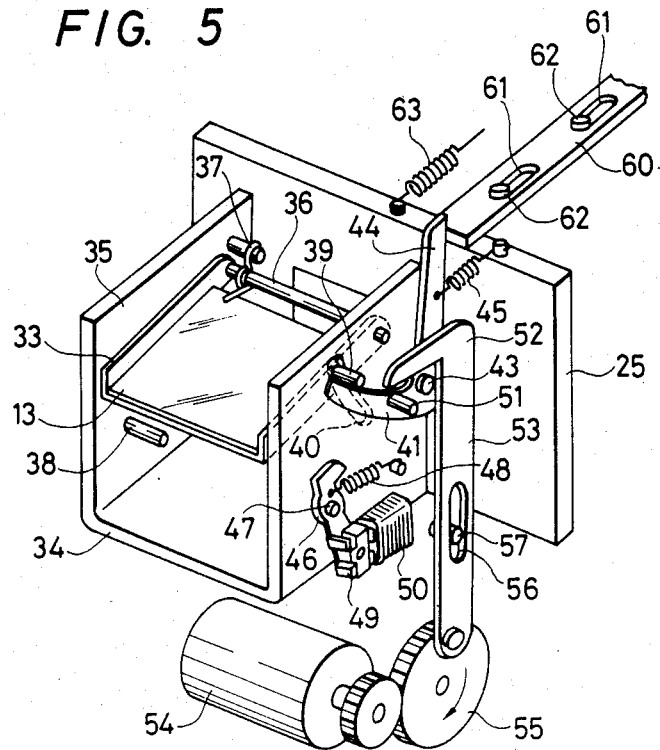
FIG. 5 is a perspective view showing an operating condition different from that shown in FIG. 3.

The device thus constructed according to the invention operates as follows: When, under the condition shown in FIGS. 3 and 4, the shutter button (not shown) is depressed, the mirror drive unit 23 is operated to energize the magent 50. As a result, the armature 49 is attracted by the magnet 50 so that the locking lever 46 is disengaged from the operating arm 41 of the operating lever 42. At the same time, the operating arm 41 is turned by the elastic force of the tension spring 45 to push the operating pin 39 upwardly, thereby to raise the image mirror 13 to a substantially horizontal position from the position where the mirror 13 forms an angle of 45° with the optical axis. That is, the image mirror 13 is retracted from the image beam as shown in FIG. 5.

When the operating arm is turned as described above, its interlocking arm 44 strikes the front end face of the tracking bar 60 so that the latter is moved backwardly a distance corresponding to the length of the guide holes 61 and the position of the stationary guide pins 62. As a result, the feed pawl 64 is the rear end of the tracking bar 60 turns the feed gear 70 in the direction of the arrow A. The rotation of the feed gear 70 is converted into linear motion of the stage 72 by means of the still belt drum 73 and the still belt 74. Accordingly, the magnetic recording head 30 is moved radially of the magnetic disk 31 as indicated by an arrow B. That is, the magnetic recording head 30 is moved to a new recording region of the magnetic disk 31 where no image signal is recorded.

On the other hand, when the image mirror 13 is raised by energizing the exciting magnet 50, the shutter drive unit 24 operates the shutter 25 so that the image sensor is exposed. Upon completion of the exposure, the image sensor drive circuit 20 and the signal processing circuit 26 convert the charges accumulated in the image sensor 12 into an electrical signal suitable to be recorded on the magnetic disk 31. The electrical signal is applied to the magnetic recording head 30. By this time instant, the magnetic recording head 30 has been moved to a new recording region of the magnetic disk 31 by means of the tracking bar 60, feed pawl 64, feed gear 70 and still belt 74. When the movement completion signal of the magnetic recording head 30 is outputted, a conventional drive device is operated in turn the magnetic disk so that the signal is recorded thereon by the magnetic recording head 30. Thus, the image signal has been recorded in the new recording region of the disk. In the recording operation, a suitable pushing mechanism is used to bring the magnetic disk 31 into contact with the magnetic recording head 30; however, the invention is not directly related to the pushing mechanism.

When the exposure is ended by closing the shutter, the motor 54 is driven, for instance, by a bottom curtain running signal to allow the drive gear 55 to make one revolution. This motion causes the charge lever 53 to move downwardly and then upwardly. During the downward movement of the charge lever, the hook 52 engages with the charge pin 51 so that the operating arm 41 of the operating lever 42 is engaged with the locking lever 46. Accordingly, the image mirror 13 is returned to the position by the elastic force of the return spring 37 where it forms an angle of 45° with the optical axis a shown in FIG. 3. At the same time, the shutter 25 is charged by the shutter drive unit 24.

When the operating lever 42 is restored as shown in FIG. 3, the interlocking arm 44 is disengaged from the front end face of the tracking bar 60, and therefore the tracking bar 60 is returned forwardly by the force of the spring 63. In this case, the feed pawl 64 remains in abutment with the feed gear 70 by the force of the feed pawl spring 66, while the reverse rotation preventing pawl 77 inhibits the reverse rotation of the feed gear 70. Therefore, the feed pawl does not affect the feed gear 70. When the image mirror 13 is quickly swung upwardly in the next photographing operation, the tracking bar 60 is moved backwardly. As a result, the feed gear 70 is turned by the movement of the tracking bar 60 so that the magnetic recording head 30 is moved radially of the magnetic disk 31.

The amount of movement of the tracking bar 60, that is, the amount of rotation of the feed gear 70 per photographing operation, can be set to a desired value. However, since signals can be recorded on the recording disk 31 with extremely high recording density, as is well known in the art, it is preferably that the amount of movement be as small as possible. For this purpose, the amount of movement of the tracking bar 60 should be set to a value corresponding to one tooth spacing to less than two tooth spacings of the feed gear 70 so that the feed gear 70 is turned through one tooth spacing per photographing operation. In this case, the feed gear 70 is turned through one tooth spacing per photographing operation with the aid of the reverse rotation preventing action of the reverse rotation preventing pawl 77.

When the entire recording area of the magnetic disk 31 has been used for recording image signals, it must be replaced with a new one. In this case, a suitable mechanism is used to disengage the reverse rotation preventing pawl 77 from the feed gear 70. After disengagement, the stage 72 is moved to the original position near the central portion of the magnetic disk 31.

In the above-described embodiment, the magnetic recording head 30 is moved horizontally. However, it goes without saying that the technical concept of the invention is applicable to the case where the head is moved vertically. In this case, the horizontal movement of the tracking bar 60 should be converted into vertical movement of another tracking bar so that the latter is operated in association with the head feed mechanism.

In the above-described embodiment, the tracking bar 60 is moved in association with the retraction of the image mirror 13 from the image beam, but since it is not always necessary to record images with the image mirror 13 swung upwardly, the tracking bar 60 may be moved in association with the motion of the image mirror 13 to the position where it forms an angle of 45° with the optical axis. That is, the tracking bar 60 may be displaced by utilizing the force of movement of the mirror 13 itself.

As is apparent from the above description, in the tracking device of the invention, the magnetic recording head is moved radially of the recording medium in association with the operation of the image mirror, and therefore, unlike the conventional tracking device, tracking can be achieved without using a special drive source such as a pulse motor or servo motor. Accordingly, the electronic camera itself can be made small in size and simplified in construction. Furthermore, the power consumption can be reduced.

I claim:

1. An electronic still single-lens reflex camera having a tracking device, comprising:
    an image sensor for subjecting the image of an object formed by a photographing lens to photoelectric conversion;
    an image mirror which is normally positioned in an image beam path for directing an image beam to a viewfinder optical system and which, when a photographing operation is carried out, is retracted from said image beam path to apply said image beam to said image sensor;
    a drive unit for driving said image mirror;
    a magnetic recording medium on which image signals provided by said image sensor are recorded;
    a magneic recording head for recording said image signals on said magnetic recording medium; and
    a head feed mechanism for moving said magnetic recording head radially of said magnetic recording medium,
    the improvement wherein:
    said head feed mechanism comprising means operated in association with operation of said drive unit for moving said magnetic recording head radially of said magnetic recording medium in association with the operation of said image mirror.

2. The electronic camera as claimed in claim 1, in which said head feed mechanism comprises:
- a stage on which said magnetic recording head is mounted, said stage being movable linearly in a direction that is radial to said magnetic recording medium;
- a rotatable feed gear having a plurality of teeth at a predetermined pitch;
- a feed pawl adapted to engage said teeth;
- a tracking bar supporting said feed pawl and movable in association with retraction of said image mirror from an image beam path to cause said feed pawl to engage said teeth and rotate said feed gear through a predetermined angle; and
- a motion converging mechanism, operatively connecting said feed gear and said stage, for converting rotation of said feed gear into linear motion of said stage.

3. The electronic camera as claimed in claim 2, further comprising: means for restricting an amount of movement of said tracking bar to a value which allows said feed pawl to turn said feed gear by an increment of one tooth spacing of said feed gear.

* * * * *